United States Patent Office 3,554,812
Patented Jan. 12, 1971

3,554,812
FUEL CELL COMPRISING ASBESTOS DIAPHRAGMS AND NICKEL MESH ELECTROLYTE SUPPORTS
Ferdinand v. Sturm and Herbert Nischik, Erlangen, Germany, assignors to Siemens Aktiengesellschaft, a corporation of Germany
Continuation-in-part of application Ser. No. 454,947, May 11, 1965. This application Feb. 14, 1969, Ser. No. 800,830
Int. Cl. H01m 27/00
U.S. Cl. 136—86    4 Claims

ABSTRACT OF THE DISCLOSURE

An asbestos diaphragm is positioned between and next adjacent the supporting structure and each of a pair of spaced thin electrodes in an electrochemical cell. The supporting structure is porous and is impregnated with nickel mesh having large pores and regions adjacent the electrodes of nickel mesh having fine pores.

DESCRIPTION OF THE INVENTION

The present application is a continuation-in-part of copending application Ser. No. 454,947, filed May 11, 1965, and entitled "Electrochemical Cell" and now abandoned.

The present invention relates to an electrochemical cell. More particularly, the invention relates to a fuel cell with very thin electrodes of one micron to one mm. thickness and an aqueous electrolyte.

Thin electrodes, as opposed to thick electrodes, permit the prevention of concentration polarization, to a large extent. Concentration polarization occurs in gas-filled pores due to a reduction of the reacting gas and in pores filled with electrolytes, due to changes in concentration, such as the thinning of the water which occurs during the reaction. However, very thin electrodes have very little or no structural stability and cannot therefore be mounted in the usual manner or subjected to the usual pressures.

In one type of device, electrodes are positioned on both sides of a diaphragm. The diaphragm comprises a flexible ion exchanger, which simultaneously functions as a solid electrolyte. As a rules, the ion exchange resins utilized contain hydration water which is depleted, for example, when air is utilized as an oxidizer. The air dries the resin and thereby interrupts the flow of current in the cell. Progressive drying of the diaphragm may lead to the total disintegration of said diaphragm.

In another type of device, the electrodes abut a magnesium oxide supporting structure, which contains a molten electrolyte. The supporting structure was found to be impractical due to the required temperatures of 500 to 700° C., since at such temperatures, cracks or separations appear in the supporting structure. Such device has thus been abandoned in favor of a paste comprising magnesium oxide and the electrolyte melt. A device utilizing the paste, however, is not suited for very thin electrodes because the past structure does not provide adequate structural stability for such electrodes due to the gas pressures encountered.

The thin electrodes may be supported by a porous structure impregnated within an aqueous electrolyte. The supporting structure has great structural stability and may consist of glass, ceramic or other suitable material. Impregnation or saturation of the supporting structure may be accomplished by outside pressure or by capillary action. Since the operating temperature of the cell is less than 200° C., the aqueous electrolyte may be selected from a wide range of possibilities. The ion exchanger is thus not limited to one type of ion, as in the case of a solid electrolyte, or to a very narrow region as in the case of a molten electrolyte.

The electrodes may comprise fine wire meshes, consisting of a catalytically effective material, or a carbon plate mesh, to which highly active catalytic material has been applied. Furthermore, the desired thin electrodes may also be produced by sintering or compression of pulverized material such as, for example, Raney nickel, silver, Raney silver, catalyzer-impregnated carbon, or DSK material. Thin foils, which conduct electrons and are permeable to hydrogen, are suitable as thin electrodes but must be supported because of their structural instability.

Thin electrodes may also be provided by metallizing the supporting structure with a thin film. The metallizing of the supporting structure may be achieved in known manner such as, for example, by vapor deposition or by non-current means. Non-current metallizing is especially suitable for applying noble metals. Other catalytically active materials may be applied to a metal support by galvanic means such as, for example, electroplating.

The reaction gases utilized such as, for example, hydrogen and oxygen, may be supplied to the device under very high pressure. At atmospheric pressure in the electrolyte tank, the gas pressure in the supporting structure is limited by the capillary pressure of the electrolyte. Upon an additional increase in pressure, gas permeates the supporting structure and interrupts the current supply at the points of additional pressure. This can be avoided by subjecting the electrolyte to pressure such as, for example, to the pressure of one of the two reaction gases, by any suitable means such as, for example, an outside gas and electrolyte chamber pressure coupled to the electrolyte tank.

In the known enclosed electrolyte device, the electrolyte may be forced by gas pressure changes from one electrode to the other through the supporting structure. The optimum limit of the three physical phases may be adjusted in one electrode only at the expense of the operation of the counter electrode. The other possibility, such as the maintenance of a constant volume of electrolyte, would entail a complicated control of the volume of water.

Penetration of one of the gases into the supporting structure occurs only if the difference of the gas pressures exceeds the capillary pressure in the supporting structure. That is, gas penetration occurs if the following equation applies:

$$|P_1 - P_2| > \frac{2\delta}{r}$$

wherein $P_1$ is the pressure of the gas such as, for example, the hydrogen, on the fuel side, $P_2$ is the pressure of the gas at the oxidation such as, for example, oxygen, $\delta$ is the surface voltage of the electrolyte, a complete wetting of the supporting material by the electrolyte being assumed, and $r$ is the pore radius of the pores of the supporting structure. As seen from the equation, the permitted pressure differences may be increased by reducing the pore radius $r$. The reduction of the pore radius $r$ in the region of the supporting structure bordering the electrodes is thus decisive and adequate.

The principal object of the present invention is to provide a new and improved electrochemical cell.

An object of the present invention is to provide an electrochemical cell having very thin electrodes.

Another object of the present invention is to provide an electrochemical cell having electrodes of one micron to one millimeter in thickness.

In accordance with the present invention, an electrochemical cell comprises a porous supporting structure positioned between thin electrodes. The supporting structure is impregnated with an aqueous electrolyte. The supporting structure has large pores in its center region and fine pores in the regions adjacent the electrodes.

In order that the present invention may be readily carried into effect, it will now be described with reference to the accompanying drawing, wherein.

Figure 1:
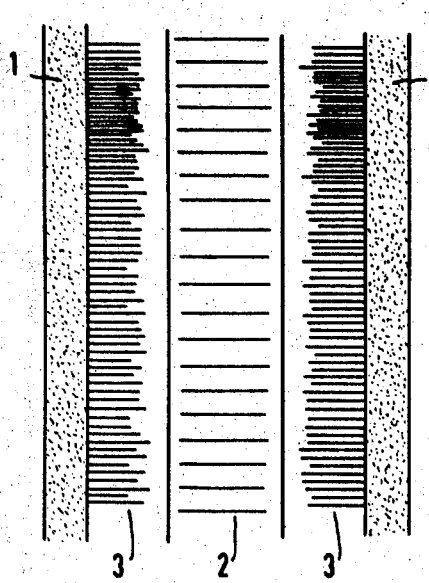
FIG. 1 is a schematic sectional view of an embodiment of the electrochemical cell of the present invention.

In FIG. 1, a supporting structure is positioned between two very thin, spaced, substantially parallel electrodes 1. The supporting structure comprises a center region 2 having large pores and regions 3 adjacent the electrodes 1 having fine pores. The supporting structure is impregnated with an aqueous electrolyte.

Figure 2:
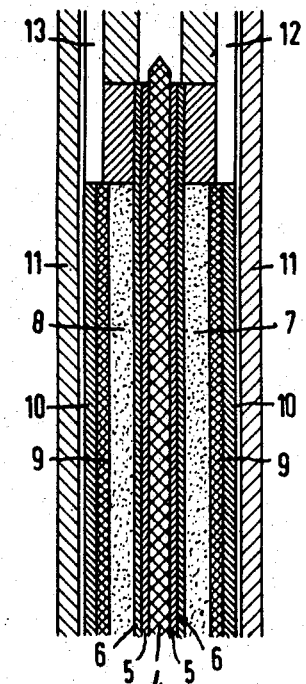
FIG. 2 is a sectional view of an operative embodiment of the electrochemical cell of the present invention.

In FIG. 2, the supporting structure is impregnated by an aqueous electrolyte. The supporting structure comprises a center region 4 having large pores. The large pores are from 0.05 to 2.0 mm. in width and are preferably 1.0 mm. in width. The center region 4 of the supporting structure thus comprises nickel mesh having a thickness of 1.15 mm. and mesh aperture or pore widths of 1.0 mm. The regions 5 of the supporting structure are adjacent the electrodes 7 and 8, between which the supporting structure is positioned. The regions 5 of the supporting structure have fine pores. The fine pores are from 0.0002 to 0.08 mm. in width and are preferably 0.001 mm. in width. The regions 5 of the supporting structure thus comprise nickel meshes having a thickness of 0.13 mm. and mesh aperture or pore widths of 0.065 mm.

A diaphragm 6 is positioned next adjacent each region 5 of the supporting structure. Each diaphragm 6 comprises asbestos having a thickness of 0.35 mm. The electrodes may be sintered such as, for example, a Bacon electrode or a Justi electrode, and may comprise a carbon nickel layer. The large pores in the center region of the supporting structure permit the circulation of the electrolyte through the cell.

The electrode 7 comprises powdered Raney nickel which is contacted and held in position by a fine nickel mesh 9. The electrode 8 comprises powdered Raney silver which is contacted and held in position by the fine nickel mesh 9. The fine nickel mesh 9 has mesh aperture or pore widths of 35 microns. The electrodes 7 and 8 are positioned next adjacent the diaphragms 6.

A coarse nickel mesh 10 is positioned next adjacent the electrode 7 and next adjacent the electrode 8. The coarse nickel mesh 10 has mesh aperture or pore widths of 1.0 mm. which function as a gas chamber. An end plate 11 is positioned next adjacent each of the coarse nickel meshes 10. Each end plate 11 is a nickel plate approximately 1.0 mm. thick and functions to absorb compression forces and transmit them inside the cell.

A conduit 12 supplies hydrogen to the gas chamber of the coarse nickel mesh 10 closer to the electrode 7. A conduit 13 supplies oxygen to the gas chamber of the coarse nickel mesh 10 closer to the electrode 8. Each of the conduits 12 and 13 leads to a corresponding source (not shown) of the gas supplied thereby.

The electrochemical cell of the present invention permits the independent selection of a suitable gas pressure for the regulation of the limit for both electrodes of the three physical phases. The transition from fine pores to large pores in the supporting structure may be continuous or intermittent. The supporting structure may be comprised of nickel mesh having different sizes of pores, a center layer thereof having large pores and layers adjacent the electrodes having fine pores.

The electrochemical cell of FIG. 2 was tested utilizing 6 mm. potassium hydroxide, at 0.02 atmosphere above ambient pressure, as the electrolyte. The reaction gases utilized were hydrogen, at 0.4 atmosphere above ambient pressure, as the fuel and oxygen, at 0.3 atmosphere above ambient pressure, as the oxidizer. The cathode 8 was powdered Raney silver having a grain size of 35 microns. The anode 7 was powdered Raney nickel having a grain size of 30 microns.

The tested cell operated at 22° centigrade at an equilibrium potential of 1.09 volt and a cell voltage of 0.95 volt at 10 milliamps per cm.$^2$ and a cell voltage of 0.75 volt at 50 milliamps per cm.$^2$.

Figure 3:
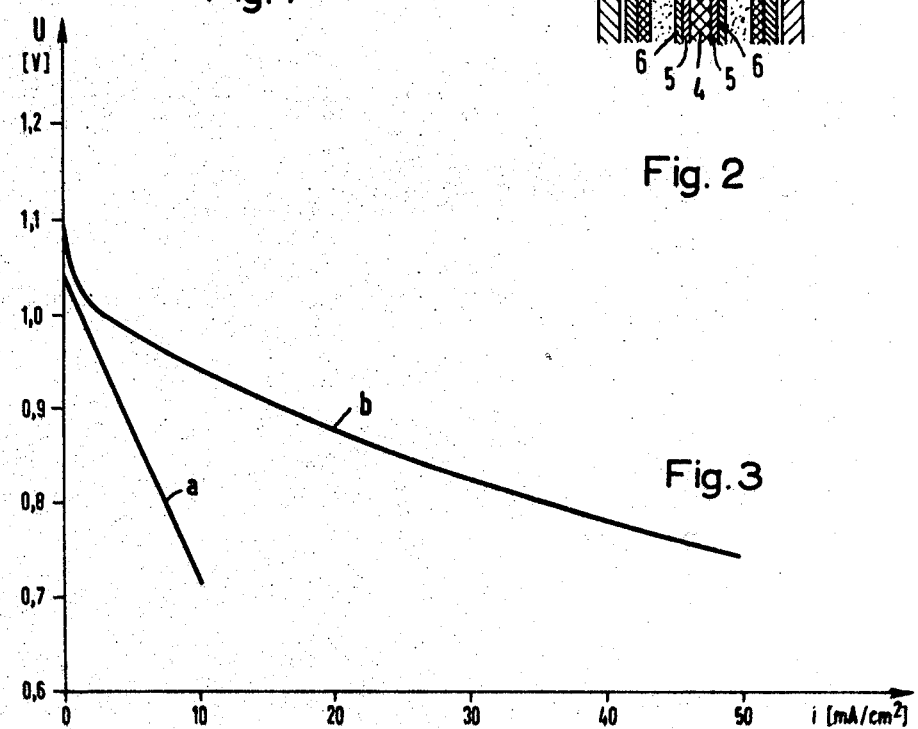
FIG. 3 is a graphical presentation of the current-voltage characteristics of the electrochemical cell of the present invention and a known electrochemical cell.

FIG. 3 is a graphical presentation of the current-voltage characteristics of the electrochemical cell of the present invention as illustrated in FIG. 2 and a known electrochemical cell. The known cell has an electrolyte carrier or supporting structure of substantially uniform pore size. The ordinate indicates the cell voltage U in volts and the abscissa indicates the current density $i$ in milliamps per cm.$^2$.

The current-voltage characteristic of the known cell is illustrated by curve $a$. The current-voltage characteristic of the cell of the present invention is illustrated by curve $b$. The curve $b$ was obtained at a hydrogen pressure of 0.4 atmosphere, above ambient pressure and an oxygen pressure of 0.3 atmosphere above ambient pressure.

While the invention has been described by means of a specific example and in a specific embodiment, we do not wish to be limited thereto, for obvious modifications will occur to those skilled in the art without departing from the spirit and scope of the invention.

We claim:

1. In an electrochemical cell,
    a pair of spaced electrodes each having a thickness between 1 and 1000 microns;
    a porous supporting structure impregnated with aqueous electrolyte positioned between said electrodes, said supporting structure comprising a center region of nickel mesh having large pores and regions adjacent said electrodes of nickel mesh having fine pores; and
    an asbestos diaphragm impregnated with aqueous electrolyte positioned between said supporting structure and each of said electrodes.

2. In an electrochemical cell,
    an anode of powdered Raney nickel held in position by a fine nickel mesh and having a thickness between 1 and 1000 microns;
    a cathode of powdered Raney silver held in position by a fine nickel mesh substantially parallel to said anode and having a thickness between 1 and 1000 microns;
    a porous supporting structure impregnated with aqueous electrolyte positioned between said anode and said cathode, said supporting structure comprising a center region of nickel mesh having large pores, a region adjacent said anode of nickel mesh having fine pores and a region adjacent said cathode of nickel mesh having fine pores;
    an asbestos diaphragm impregnated with aqueous electrolyte positioned between said supporting structure and said anode; and
    an asbestos diaphragm impregnated with aqueous electrolyte positioned between said supporting structure and said cathode.

3. In an electrochemical cell as claimed in claim 2, wherein said fine nickel mesh is positioned next adjacent said anode and next adjacent said cathode and further comprising a coarse nickel mesh on the side of the fine nickel mesh away from the anode and a coarse nickel mesh on the side of the fine nickel mesh away from the cathode.

4. In an electrochemical cell,
    an anode of powdered Raney nickel held in position by a fine nickel mesh and having a thickness between 1 and 1000 microns;

a cathode of powdered Raney silver held in position by a fine nickel mesh substantially praallel to said anode and having a thickness between 1 and 1000 microns;

a porous supporting structure impregnated with aqueous electrolyte positioned between said anode and said cathode, said supporting structure comprising a center region of nickel mesh having large pores, a region adjacent said anode of nickel mesh having fine pores and a region adjacent said cathode of nickel mesh having fine pores;

an asbestos diaphragm impregnated with aqueous electrolyte positioned between said supporting structure and said anode and between said supporting structure and said cathode;

a coarse nickel mesh positioned next adjacent one of said fine nickel meshes;

a coarse nickel mesh positioned next adjacent the other of said fine nickel meshes;

means for supplying hydrogen gas to the first-mentioned coarse nickel mesh next adjacent said anode; and means for supplying oxygen gas to the last-mentioned coarse nickel mesh next adjacent said cathode.

References Cited

UNITED STATES PATENTS

| | | | |
|---|---|---|---|
| 3,160,527 | 12/1964 | Hess | 136—86 |
| 3,253,956 | 5/1966 | Vielstich et al. | 136—86 |
| 3,265,536 | 8/1966 | Miller et al. | 136—86 |
| 3,364,071 | 1/1968 | Kordesch | 136—86 |
| 3,206,333 | 9/1965 | Ehrenfeld | 136—86 |

WINSTON A. DOUGLAS, Primary Examiner

H. A. FEELEY, Assistant Examiner

PO-1050
(5/69)

UNITED STATES PATENT OFFICE
CERTIFICATE OF CORRECTION

Patent No. 3,554,812              Dated January 12, 1971

Inventor(s) FERDINAND v. STURM and HERBERT NISCHIK

It is certified that error appears in the above-identified patent and that said Letters Patent are hereby corrected as shown below:

In the heading the German priority number and filing date should be added: Germany, filed May 14, 1964,
S 91058 VIb/12h Signed and sealed this 22nd day of June 1971.

(SEAL)
Attest:

EDWARD M. FLETCHER, JR.
Attesting Officer

WILLIAM E. SCHUYLER, JR.
Commissioner of Patents